Sept. 2, 1952 H. W. HAPMAN 2,609,081
FLIGHT CONVEYER
Filed Feb. 8, 1950
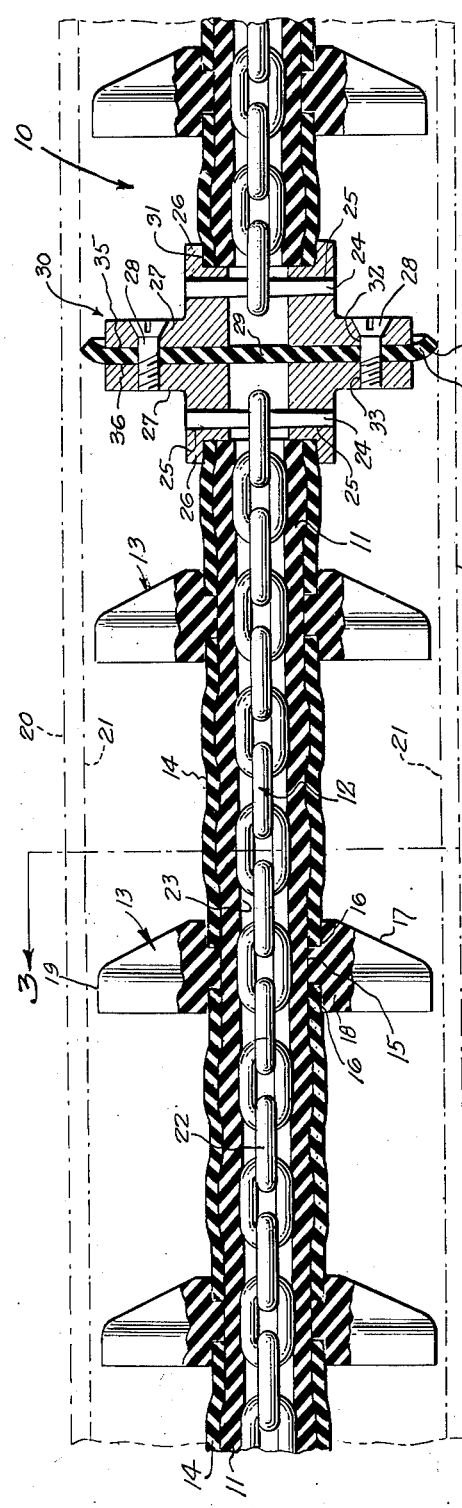
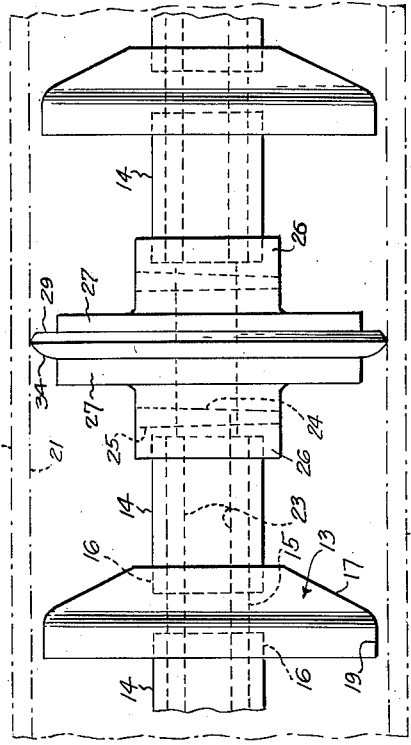
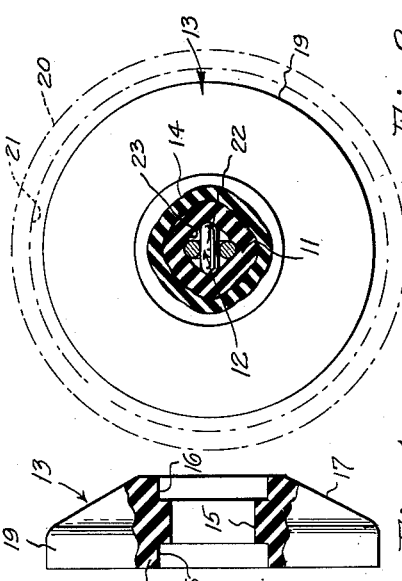
Inventor
Henry W. Hapman
By Barthel & Bugbee
Attorneys Patented Sept. 2, 1952

2,609,081

UNITED STATES PATENT OFFICE 2,609,081

FLIGHT CONVEYER

Henry W. Hapman, Detroit, Mich., assignor of forty per cent to Hannah Jane Hapman, Detroit, Mich.

Application February 8, 1950, Serial No. 143,118

3 Claims. (Cl. 198—168)

1

This invention relates to conveyors and, in particular, to flight conveyors.

One object of this invention is to provide a flight conveyor which is substantially free from any flat surfaces, recesses or crevices in which the conveyed materials might lodge or to which they might adhere, such a conveyor being especially useful for conveying food and chemical products.

Another object is to provide a flight conveyor having disc flights mounted on a flexible elongated tubular member within which is a load-carrying chain, all arranged in such a manner that the chain is completely isolated from the exterior of the conveyor so that none of the conveyed material can penetrate to the chain.

Another object is to provide a flight conveyor of the foregoing character wherein the flexible tubular member containing the chain also contains lubricant for lubricating the links of the chain so that it performs its load-transmitting functions with the minimum of noise and wear, and at the least expenditure of power.

Another object is to provide a flight conveyor of the foregoing character wherein the links of the chain are slightly greater in diameter than the diameter of the bore in the tubular member, with the result that the links cause the tubular member to bulge and thereby prevent the flights from sliding along the tubular member by securely anchoring them in place.

Another object is to provide a flight conveyor of the foregoing character wherein the flights are spaced apart from one another along the flexible tubular member by flexible tubular spacers which are preferably assembled in a state of compression so as to automatically maintain their spacing and sealing functions even though the tubular member should stretch somewhat during use.

Another object is to provide a flight conveyor of the foregoing character wherein the disc flights are provided with countersinks or counterbores for receiving the ends of the tubular spacers, thereby preventing the formation of a recess for the lodgment of conveyed materials.

Another object is to provide a flight conveyor of the foregoing character wherein the adjacent ends of the load-transmitting chain are connected to coupling halves which are secured to one another, preferably with a resilient gasket between them so as to prevent the conveyed material from

2 entering the space between the coupling halves and also to prevent lubricant from escaping out of the interior of the flexible tubular member, the gasket being optionally in the form of a disc or ring with its periphery extending outward beyond the coupling halves so as to serve as a wiper.

In the drawings:

Figure 1 is a side elevation, mainly in central longitudinal vertical section, of a portion of a flight conveyor according to one form of the present invention showing the distortion of the flexible tubular member and spacers after the load-transmitting chain has been installed;

Figure 2 is a side elevation of the right-hand portion of the flight conveyor shown in Figure 1, before the load-transmitting chain has been installed, and hence before the flexible tubular member and spacers have been distorted by it;

Figure 3 is a cross-section taken along the line 3—3 in Figure 1; and

Figure 4 is a side elevation, partly in central longitudinal section, of one of the disc flights used in the flight conveyor of Figures 1 to 3 inclusive.

Referring to the drawings in detail, Figures 1 and 3 show a flight conveyor, generally designated 10, according to one form of the invention as consisting generally of a flexible tubular member 11 containing a load-transmitting chain 12 and carrying disc flights 13 spaced apart from one another along the tubular member 11 by flexible tubular spacers 14. The tubular member 11 is preferably of elastic deformable material, such as synthetic or natural rubber or a mixture thereof, preferably having reinforcing cords or fabric molded therein (not shown). The flexible tubular member 11 is preferably of a relatively hard rubber or synthetic rubber so that it cannot be compressed very much. The tubular spacers 14, on the other hand, are preferably of very flexible rubber or synthetic rubber which renders them capable of considerable compression.

The flights 13 have central bores 15, the opposite ends of which terminate in enlarged counterbores 16 (Figure 4). The bore 15 is of substantially the outer diameter of the tubular member 11, whereas the counterbores 16 are of substantially the same diameters as the outer diameter of the tubular spacers 14 so as to make a tight junction therebetween which will prevent the formation of crevices in which particles of the conveyed material can lodge. The flights 13 are preferably tapered as at 17 so that their central portions 18 are thicker than their peripheral portions 19. The flights 13 are also of relatively hard rubber sufficient to stand the pull exerted upon them when the conveyor 10 is driven by V-pulleys or the like, yet flexible enough to adapt themselves to passing around such pulleys or to traversing sharp bends in the conveyor conduit 20 (indicated by dotted lines) in which the flight conveyor 10 is mounted. The conduit 20, the details of which are beyond the scope of the present invention, has a bore or inner surface 21 of slightly larger diameter than the diameter of the flights 13.

The load-transmitting chain 12 is of any suitable type, preferably of the so-called coil-chain type with interconnected links 22, the cross diameters of which are slightly greater than the diameter of the inner surface or bore 23 of the elongated tubular member 11 (Figure 3). The end links 22 of the chain 12 are connected to members 24, such as taper pins inserted in tapered bores 25 in the hubs 26 of coupling halves 27 which are connected to one another by suitable fasteners 28 having a disc or ring-like gasket 29 inserted therebetween, the assembly as a unit forming a coupling, generally designated 30. Each coupling half 27 has a counterbore 31 in its hub portion 26 of a sufficient diameter to receive both the tubular member 11 and the tubular spacer 14 superimposed upon it. The coupling halves 27 are bored as at 32 and 33 to receive the fasteners 28, the bores 33 being preferably threaded. The fasteners 28 are preferably of such a type as to have all portions flush with the surfaces of the coupling halves 27 so as to form no crevices for the lodgment of particles of the conveyed material, the slots in the screws or sockets in the headless set screws, if used, being filled in with a suitable filler to prevent the formation of such crevices. The gasket 29 is preferably of a larger diameter than the coupling halves 27 and flights 13 so as to have a projecting peripheral portion 34 which will engage the inner wall or bore 21 of the conveyor conduit 20 and serve as a wiper. The gasket 29 is preferably formed from elastic deformable material, such as rubber or synthetic rubber, and the opposing faces 35 and 36 of the coupling halves 27 are also preferably flat for efficient engagement with the gasket 29.

In assembling the flight conveyor 10 of the invention, the flights 13 alternating with their spacers 14 are mounted upon the tubular member 11 in a manner analogous to stringing beads or spacers upon a cord or chain. The rubber spacers 14 are of such length that the combined length of the spacers and the flights exceeds the total length of the tubular member 11. As a consequence, the spacers 14 are assembled in a state of compression. When, however, the spacers 14 and flights 13 have been assembled on the tubular member 11 in the manner shown in Figure 2, the coil chain 12, which has been previously coated with oil or grease, is pulled through the slightly smaller diameter bore 23 of the tubular member 11, distorting it as this proceeds in the manner shown in Figure 1. If the flight conveyor 10 is assembled in straight lengths, one end of the chain 12 is secured to a coupling half at one end by passing a tapered pin 24 through one of the lengths 22 (Figure 1). The chain is then pulled through the tubular member 11 and the spacers 14 and the flights 13 pushed backward along the tubular member 11 so as to compress the spacers 14 to the desired extent. When this has been accomplished, the tapered pin 24 at the other end of the tubular member 11 is inserted through the nearest link 22 of the chain 12, and surplus links are cut off.

The lubricant with which the chain 12 has been coated remains inside the bore 23 of the tubular member 11 and permanently lubricates the chain 12. The bulges brought about by pulling the chain 12 through the tubular member 11 firmly anchor the flights 13 in position and prevent them from sliding longitudinally and also prevent the spacers 14 from slipping out of the counterbores 16 or 31. The successive lengths of the conveyor (or the single length thereof, if it is so made) are united to other lengths or to the opposite free end of the same conveyor length by uniting the respective coupling halves 27 with a gasket 29 placed in between the opposing surfaces 35 and 36. When the fasteners 28 are tightened, the compression of the gasket 29 eliminates all possibility of leakage either into or out of the interior of the conveyor and effectively seals the conveyor. The clearance between each flight 13 and the tubular member 11 is so small that the pulling of the chain through the tubular member 11 produces bulges of sufficient height or diameter to lock the flights 13 in position.

In the operation of the conveyor 10, the flights 13 are driven by V-pulleys or other suitable arrangements but the actual load is carried by the chains 12 and coupling or couplings 30. As the conveyor traverses its path within the conveyor conduit 20, the peripheral portion 34 of the gasket 29 serves as a wiper to wipe the conveyed materials off the inner surface or internal bore 21. If, during the life of the conveyor, stretching of the tubular member 11 does take place as a result of its being overstressed, one of the taper pins 24 can be removed from one of the coupling halves 27, the stretch taken up by pulling up on the chain, and the taper pin 24 reinserted in a new link 22, the excess links being then cut off.

What I claim is:

1. A flight conveyor comprising an elongated tubular member of elastic deformable material, a plurality of disc flights mounted on said tubular member in spaced relationship and in sealed engagement therewith, and an elongated interlocking link chain disposed within said tubular member, the links of said interlocking link chain having cross-diameters exceeding the internal diameter of the bore of said tubular member and exteriorly deforming said tubular member with bulges locking said flights in their spaced positions upon said tubular member.

2. A flight conveyor comprising an elongated tubular member of elastic deformable material, a plurality of disc flights mounted on said tubular member in spaced relationship and in sealed engagement therewith, an elongated interlocking link chain disposed within said tubular member, and tubular spacers disposed between said flights, the links of said interlocking link chain having cross-diameters exceeding the internal diameter of the bore of said tubular member and exteriorly deforming said tubular member with bulges locking said flights in their spaced positions upon said tubular member.

3. A flight conveyor comprising an elongated tubular member of elastic deformable material, a plurality of disc flights mounted on said tubular member in spaced relationship and in sealed engagement therewith, an elongated interlocking link chain disposed within said tubular member, and a pair of interconnectable coupling halves secured to opposite ends of said interlocking link chain, each of said coupling halves having a cavity therein receiving one end of said tubular member in sealing engagement, and a chain-anchoring element in said cavity secured to its respective coupling half, the opposite ends of said chain being anchored to said chain anchoring elements in their respective cavities.

HENRY W. HAPMAN.

REFERENCES CITED

The following references are of record in the file of this patent:

UNITED STATES PATENTS

| Number | Name | Date |
| --- | --- | --- |
| 256,167 | Shaw | Apr. 11, 1882 |
| 847,228 | Bixby | Mar. 12, 1907 |
| 936,204 | Whitlock | Oct. 5, 1909 |
| 984,099 | Manoog | Feb. 14, 1911 |
| 1,970,250 | Redler | Aug. 14, 1934 |
| 2,156,353 | Ranney | May 2, 1939 |
| 2,326,535 | Hapman | Aug. 10, 1943 |